United States Patent [19]

Gronwick

[11] Patent Number: 5,730,415
[45] Date of Patent: Mar. 24, 1998

[54] FLUSH VALVE TRIPLE SEAL HANDLE PACKING

[75] Inventor: Jerry P. Gronwick, Park Ridge, Ill.

[73] Assignee: Sloan Valve Company, Franklin Park, Ill.

[21] Appl. No.: 707,998

[22] Filed: Sep. 6, 1996

[51] Int. Cl.$^6$ .............................. F16K 41/10; F16J 15/32
[52] U.S. Cl. ...................... 251/40; 251/214; 251/335.1; 277/208; 277/215
[58] Field of Search .................... 251/40, 214, 335.1, 251/335.2, 335.3; 277/207 R, 207 A, 208, 213, 215

[56] References Cited

U.S. PATENT DOCUMENTS

| | | | |
|---|---|---|---|
| 3,183,009 | 5/1965 | Kunel | 277/208 |
| 3,279,742 | 10/1966 | Billeter | 251/40 |
| 3,979,130 | 9/1976 | Cowie | 277/208 |
| 4,285,498 | 8/1981 | Nightingale | 251/214 |
| 4,327,891 | 5/1982 | Allen | 251/40 |
| 4,695,061 | 9/1987 | Meisner et al. | 251/214 |
| 5,020,810 | 6/1991 | Jobe | 277/207 A |
| 5,026,021 | 6/1991 | Pino | 251/40 |
| 5,234,194 | 8/1993 | Smith | 251/214 |

FOREIGN PATENT DOCUMENTS 658528  2/1963  Canada ............................ 251/40

Primary Examiner—George L. Walton
Attorney, Agent, or Firm—Dorn, McEachran, Jambor & Keating

[57] ABSTRACT

A toilet flushing device has a body with an inlet and an outlet. There is a valve seat in the body in the flow path between the inlet and the outlet and a valve in the body movable toward and away from the valve seat to control water flow through the toilet flushing device. A handle assembly for causing movement of the valve toward and away from the valve seat includes a socket attached to the body and a handle mounted in the socket for pivotal movement. A plunger is positioned in part within the socket and is in contact with the handle. Pivotal movement of the handle causes axial movement of the plunger with a portion of the plunger being positioned for contact with valve for causing movement thereof. There is a spring for biasing the plunger toward the handle. A bushing is attached to the socket and has a central bore within which the plunger moves. A seal member is attached to the bushing and forms a seal therewith. The seal member has a central passage with the plunger being positioned within this central passage. The seal member has a plurality of spaced inwardly extending circumferential seal lobes which are in sealing contact with the plunger at axially spaced locations thereon. The lobes define at least one recess therebetween and there is lubricant within the at least one recess.

1 Claim, 1 Drawing Sheet

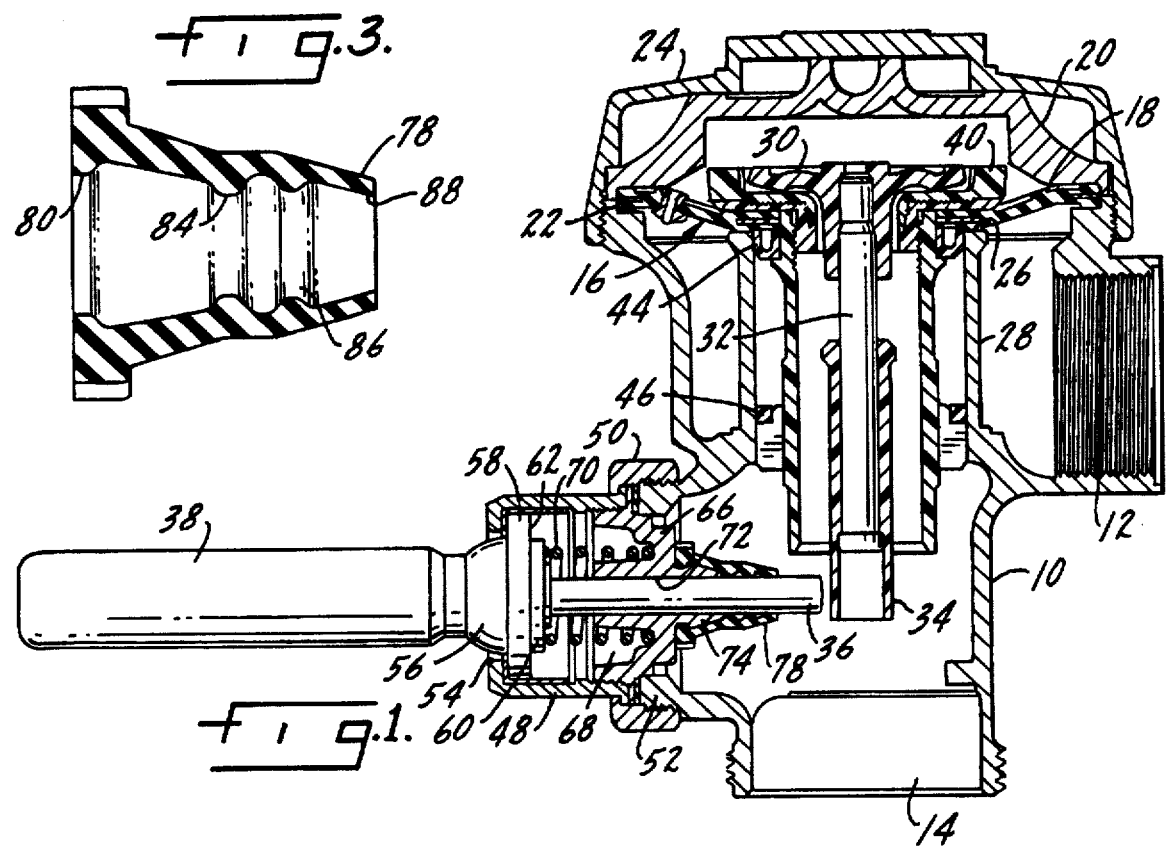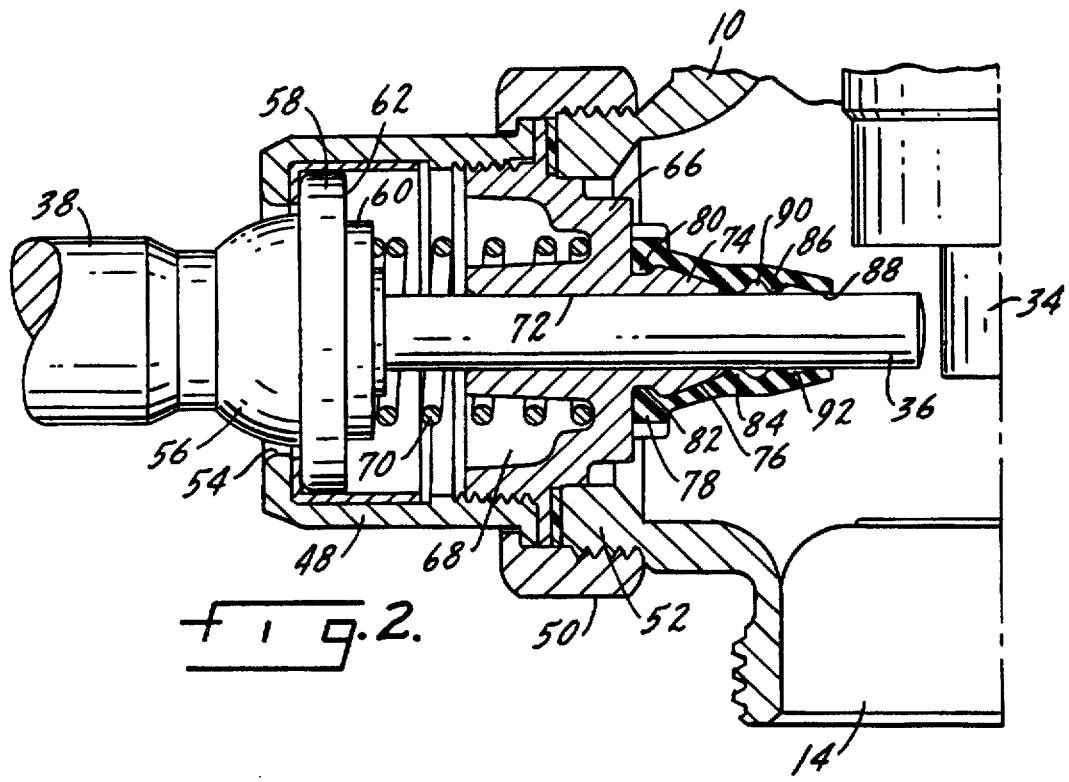

FLUSH VALVE TRIPLE SEAL HANDLE PACKING

THE FIELD OF THE INVENTION

The present invention relates to flush valves or flushometers as they are commonly designated which are used to provide a measured amount of water to flush a urinal or water closet. The assignee of the present application, Sloan Valve Company of Franklin Park, Ill., sells several types of flushometers arranged for manual operation, one of which is marketed under the trademark ROYAL. The present invention is specifically directed to the handle assembly for manually operating the flushometer and more particularly to an improved seal to prevent leakage of water from the body of the flushometer out through the handle assembly.

The handle assembly includes a socket which mounts to the body of the flushometer and a handle which pivotally moves in the socket. Movement of the handle will cause a spring biased plunger to move into the body of the flushometer and, in the ROYAL brand flushometer, to trip a relief valve permitting a venting of the pressure chamber to open the valve so that flushing water may pass from the inlet to the outlet. A seal is positioned on the plunger and is mounted to the bushing which holds the plunger. The seal has a plurality of axially spaced inwardly extending circumferential seal lobes which are in contact with the plunger at axially spaced locations. The lobes define recesses therebetween and there is lubricant within the seal recesses.

SUMMARY OF THE INVENTION

The present invention relates to toilet room devices and particularly to flushometers and more specifically to an improved handle seal for a flushometer.

A primary purpose of the invention is to provide a handle assembly which has an improved seal, preventing leakage from the body of the flushometer out through the handle assembly.

Another purpose is a handle assembly which is simple in construction and reliably operable.

Another purpose is a handle assembly for the use described in which there are a plurality of spaced sealing point with recesses for lubricant therebetween.

Other purposes will appear in the ensuing specification, drawings and claims.

BRIEF DESCRIPTION OF THE DRAWINGS

FIG. 1 is a cross section illustrating a flushometer of the type described with the handle assembly shown thereon;

FIG. 2 is an enlarged cross section illustrating the handle assembly; and

FIG. 3 is an enlarged cross section of the seal.

DESCRIPTION OF THE PREFERRED EMBODIMENT

The handle assembly of the present invention will be described in connection with a flushometer of the type sold by Sloan Valve Company under the trademark ROYAL. The invention should not be limited to this particular type of flushometer and is applicable in any flushometer in which movement of a handle causes axial movement of a plunger to trip a relief valve.

The flushometer includes a body 10 having an inlet connection 12 and an outlet connection 14. A diaphragm assembly indicated generally at 16 includes a diaphragm 18 peripherally held to the body 10 by an inner cover 20. The diaphragm is seated upon a shoulder 22 at the upper end of body 10 and is clamped in this position by the inner cover 20. An outer cover 24 is screwthreaded onto the body to hold the inner cover in position.

The diaphragm assembly 16 is closed upon a valve seat 26 formed at the upper end of a barrel 28. The barrel 28 forms the conduit connecting the valve seat with outlet 14. The diaphragm assembly 16 includes a relief valve 30 having a downwardly extending stem 32 carrying a movable sleeve 34. Sleeve 34 is positioned for contact by a plunger 36 when operated by a handle 38.

The diaphragm assembly 16 in addition to the diaphragm 18 and the relief valve 30, includes a retaining disk 40, a refill ring 44, and a flow control ring 46. Further details of the diaphragm assembly are disclosed in U.S. Pat. No. 5,505,427 also owned by Sloan Valve Company.

The handle assembly of the present invention includes a socket 48 which is held by a handle coupling 50 to an exteriorally threaded boss 52 forming a part of the flush valve body 10. The socket 48 has an opening 54 through which the handle 38 extends. The handle 38 has a spherical portion 56 which is positioned within the opening 54 and provides for pivotal movement of the handle relative to the socket. Directly adjacent the spherical portion 56 there is an outwardly directed flange 58 of the handle which is seated within socket 48.

The plunger 36 has a flat end 60 which is in planer contact with the flat end 62 of handle 38. When the handle 38 is pivotally moved within opening 54, it will cause axial inward movement of the plunger 36 to contact the relief valve sleeve 34 to trip the relief valve for operation of the flush valve.

A bushing 66 is threaded to the interior of socket 48 and has a circumferential cavity 68 within which is positioned a coil spring 70 which normally biases plunger 36 to the unoperated position shown in the drawing. Bushing 66 has a passage 72 within which the plunger 36 moves in an axial direction to operate the flush valve. Bushing 66 has an axial extension, indicated at 74, with a tapered exterior 76. Mounted on the axial extension 74 of the bushing is a seal element 78. The seal element 78 has an inwardly directed circumferential projection 80 which extends within a recess 82 in the bushing projection 74, thus attaching the seal element to the bushing.

The seal element 78 has a plurality, in this case three, inwardly and circumferentially extending seal lobes 84, 86 and 88 each of which is in sealing contact with the exterior of the plunger 36. The lobes 84, 86 and 88, define between them a pair of circumferential recesses 90 and 92, which recesses will contain a suitable lubricant for greasing the plunger to facilitate its movement between operated and unoperated positions. The distance between lobes 84 and 88 is longer than the stroke of plunger 36 which insures that the plunger is always in contact with seal lobe 84 to protect the shaft from foreign material. Seal lobe 88 has a sharp edge so that it functions as a scraper, preventing foreign matter from entering the lubricant recesses.

In operation, pivotal movement of handle 38 causes its end surface 62 to move the plunger against the bias of spring 70, in an inward axial direction to where it contacts and tilts the relief valve 30. This vents the pressure in the chamber above the relief valve, causing the diaphragm to unseat from seat 26 permitting a clear flow path from the inlet 12 to the outlet 14.

The seal element 78 is particularly advantageous in that it provides a plurality of separate sealing points between its interior and the movable plunger. The lobes 84, 86 and 88 provide such spaced seal areas and the recesses 90, 92 therebetween provide reservoirs for lubricant to provide for smooth movement of the plunger between its operated and unoperated positions. The combination of the multiple sealing points with lubricant therebetween provides a complete seal preventing any leakage of water from the interior of the flushometer body out through the handle assembly.

Whereas the preferred form of the invention has been shown and described herein, it should be realized that there may be many modifications, substitutions and alterations thereto.

The embodiments of the invention in which an exclusive property or privilege is claimed are defined as follows:

1. A toilet flushing device including a body, an inlet and outlet in said body, a valve seat in said body in the flow path between said inlet and outlet, valve means in said body movable toward and away from said valve seat to control water flow from said inlet to said outlet, a handle assembly for causing movement of said valve means from a closed position on said valve seat to an open position away from said valve seat, said handle assembly including a socket attached to said body, a handle mounted in said socket for pivotal movement, a plunger positioned in part within said socket and in contact with said handle, pivotal movement of said handle causing axial movement of said plunger, a portion of said plunger being positioned for contact with said valve means for causing movement thereof, spring means biasing said plunger toward said handle, a bushing attached to said socket and having a central bore within which said plunger moves, a seal member extending axially along said plunger and attached to said bushing and forming a seal therewith, said seal member having a central passage, said plunger being positioned within said seal member central passage in a static position and during axial movement of said plunger, said seal member passage having three circumferentially inwardly extending seal lobes which are in sealing contact with said plunger at axially spaced locations thereon, one of said seal lobes being at an end of said seal member, said lobes defining two spaced recesses therebetween, with lubricant in said recesses, said seal member having a radially inwardly extending projection at one end thereof, an interlocking groove on said bushing, with said seal member inward projection extending into said recess to attach said seal member to said bushing, said bushing having an axially extending tapered projection, with an interior portion of said seal member conforming to and being in contact with said axially extending tapered projection, the middle one of said inwardly extending circumferential seal lobes being directly adjacent and in contact with the end of said tapered portion of said bushing.

\* \* \* \* \*